Nov. 5, 1957     A. R. CRAWFORD     2,812,457
BALANCING BLOCKS

Filed Nov. 27, 1953     2 Sheets-Sheet 1

INVENTOR.
ARTHUR R. CRAWFORD
BY
ATTORNEYS

Nov. 5, 1957  A. R. CRAWFORD  2,812,457
BALANCING BLOCKS

Filed Nov. 27, 1953  2 Sheets-Sheet 2

INVENTOR.
ARTHUR R. CRAWFORD
BY
ATTORNEYS

United States Patent Office 2,812,457
Patented Nov. 5, 1957

2,812,457

BALANCING BLOCKS

Arthur R. Crawford, Columbus, Ohio, assignor to International Research and Development Corporation, Columbus, Ohio, a corporation of Ohio Application November 27, 1953, Serial No. 394,672

7 Claims. (Cl. 310—91)

My invention relates to balancing blocks. It has to do, more particularly, with blocks which are designed to support a rotor during balancing and which have means associated therewith for picking up vibration caused by any imbalances in the rotor.

One of the objects of my invention is to provide a balancing block which is provided with self-aligning bearings.

Another object of my invention is to provide a balancing block which has bearings of such a nature that it is never necessary to lubricate them.

Another object of my invention is to provide a balancing block which is so designed that the bearings can be removed and replaced readily.

Another object of my invention is to provide a balancing block which has means associated therewith for preventing the block from functioning if overloaded.

A further object of my invention is to provide a balancing block with a vibration pick-up device associated therewith which can be set readily to resonate at the speed of rotation it is intended to balance the rotor thereon.

Various other objects will be apparent.

The preferred embodiment of my invention is illustrated in the accompanying drawings wherein similar characters of reference designate corresponding parts and wherein.

Figure 1:
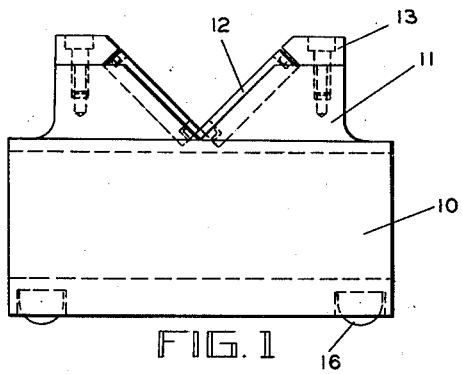
Figure 1 is a side elevational view of a balancing block embodying my invention.
Figures 2, 3, 4:
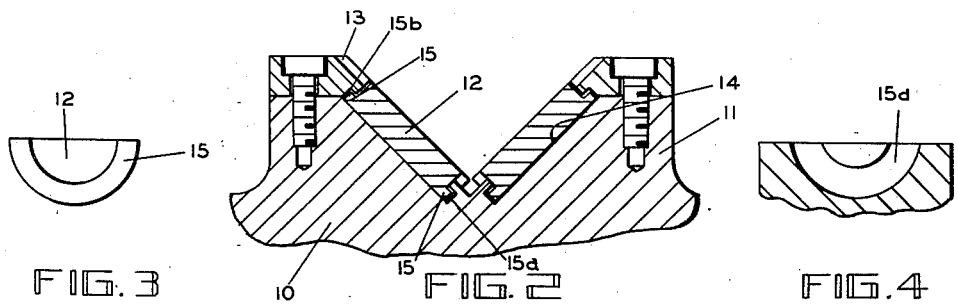
Figure 2 is an enlarged vertical longitudinal sectional view of the upper or bearing portion of the block.
Figure 3 is a view showing the shape of the end of one of the bearing elements.
Figure 4 shows the shape of the end of the socket into which the end of the bearing element fits.

With reference to the drawings, the balancing block includes a body 10 in the form of a block of metal or other suitable material. The body 10 is provided with an integral upstanding bearing support 11 which provides a transversely-extending V-shaped cradle adapted to receive a pair of bearing elements 12 in a pair of sockets 14. The bearing elements 12 are held in position by a pair of caps 13 fastened to the top of the support 11 in association with the respective bearing elements 12.

The bearing support 11 is provided with semi-cylindrical sockets 14 which receive the semi-cylindrical bearing elements 12. These bearing elements 12 are preferably formed of brass or other material, formed by powder metallurgy, which include a lubricant in powdered form so that it will never be necessary to lubricate the bearing elements. Each of the bearing elements 12 is an elongated member of semi-cylindrical cross section and at each end has an extension 15 of arcuate cross-section being flush with the curved under surface thereof but being of much less thickness than the body of the bearing element.

The lower end of each socket 14 is shaped complementally to the end of the bearing element 12 being provided with an arcuate groove 15a for receiving the arcuate extension 15 on the lower end of the associated bearing element 12. Similarly, each cap 13 is provided with an arcuate groove 15b for receiving the arcuate extension 15 on the upper end of the associated bearing element 12.

Thus, when the bearing elements 12 are disposed in the sockets 14 they will be in V-relationship. They will be precluded from moving axially out of the sockets 14 by the caps 13. However, they will be free to rock in the sockets about the axes of the sockets. They can be removed, without removing the caps 13, by rocking them out of the sides of the sockets and can be re-inserted or be replaced with other elements in a similar manner.

Figure 5:
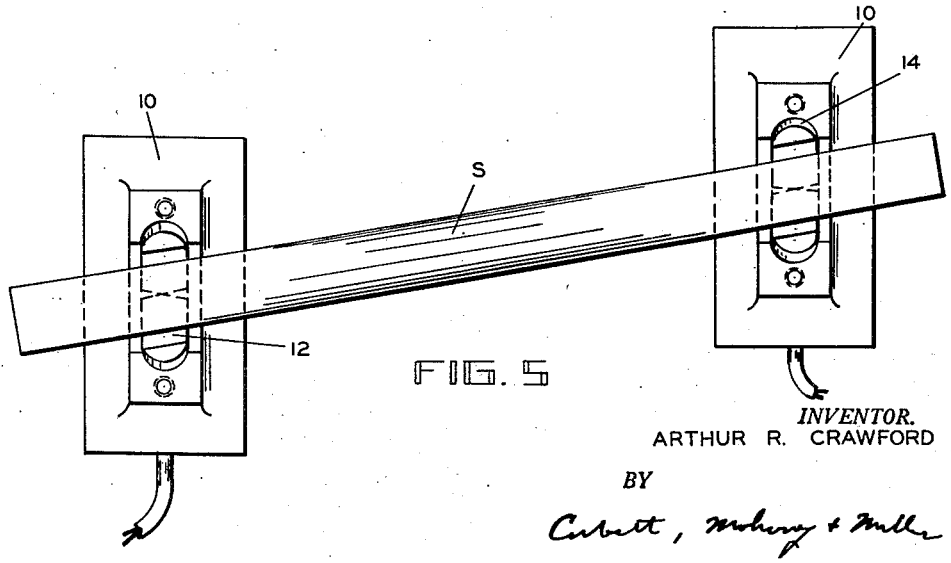
Figure 5 shows the block in use and indicates that the bearings are self-aligning.

With this arrangement, as indicated in Figure 5, the bearing elements will be self-aligning. For example, if a shaft S is to be balanced, it will be supported on two of these blocks and will be driven by a suitable drive, for example a belt-drive, at the speed at which it is to be balanced. The blocks are shown greatly out of alignment to demonstrate that the bearing elements 12 will be self-aligning even if the shaft or other rotor is not true.

To permit imbalances in the object being balanced to cause vibration of the blocks, the blocks are provided with compressible feet 16. These feet are designed to receive a predetermined load. If the load is exceeded, the feet will compress to such an extent that the block will rest rigidly on the supporting surface and the block will not vibrate.

Figure 6:
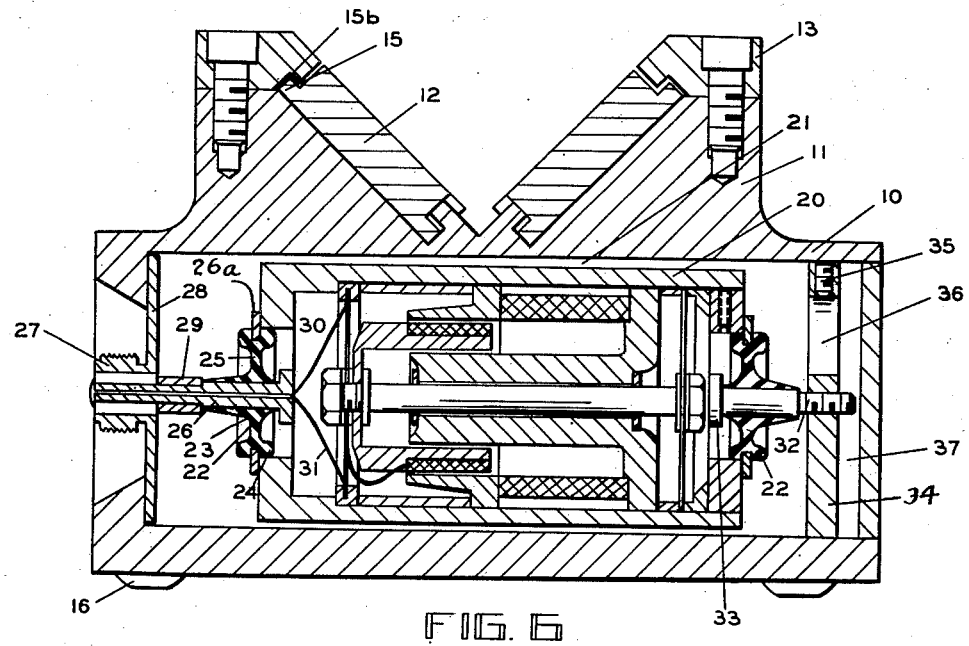
Figure 6 is a vertical sectional view through the block showing the pick-up device therein.
Figure 7:
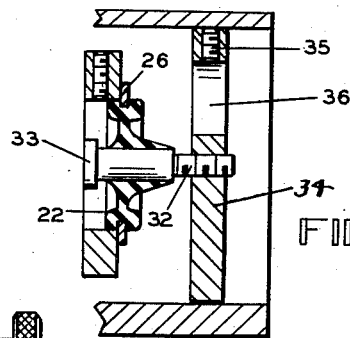
Figure 7 is a detail in vertical section showing the arrangement for adjusting the resonance of the pick-up device.

In Figure 6, I have illustrated a voltage generating vibratory pick-up device in the block. Each block will contain one of these pick-up devices. In the main, the pick-up device is like that disclosed in the copending application, Ser. No. 312,021, of Theodore Ongaro, filed September 29, 1952, now Patent 2,754,435, July 10, 1956. However, I provide a special arrangement for suspending it in the block so that it will respond to the vibrations of the block.

The tube 20, which is the housing for the pick-up device, is disposed within a tubular chamber 21 which is of larger diameter than the tube so that the tube can vibrate therein without contacting the wall of the chamber. At the ends of the tube 20 flexible supporting diaphragms 22 are provided for suspending the pick-up device in the chamber 21. The diaphragms are preferably made of rubber and each diaphragm comprises a hub 23, a rim 24, and a connecting web 25. The rim 24 of each diaphragm is attached to the adjacent end of the tube 20 by means of a ring 26a.

The hub 23 of the diaphragm 22 at the left-hand end of the pick-up device surrounds the supporting pin 26 which is mounted in a fitting 27 provided in a disc 28 which closes that end of the chamber 21. A spacer 29 is provided on the pin 26 between the disc 28 and the hub 23. The inner end of the pin 26 has a head 30 and it will be apparent that the hub 23 of the diaphragm will be between the spacer 29 and the head 30. The pin 26 has a bore through which pass the leads 31 from the voltage-generating magnet of the pick-up device.

The hub 23 of the other diaphragm 22 is mounted on a pin 32 which has a head 33 on its inner end. The outer end of this pin 32 is anchored in a member 34 which is mounted for axial sliding adjustment in the chamber 21. It is held in adjusted position by a set-screw 35 which leads radially from a tool-inserting opening 36 through the edge of the member 34. The member 34 is preferably hexagonal or other angular form so it can be removed even if the sides of the chamber 21 are marred by several settings of the screw 35 into contact therewith. This end of the chamber 21 is closed by a disc plug 37.

It will be apparent that if the member 34 is slid to the right from its initial position shown in Figure 6, the hubs 33 of the two diaphragms will be moved outwardly in opposite directions, stretching the webs 25 of the diaphragms. These diaphragms may be stretched to such an extent that they will be in proper resonance at the balancing speed to be used. Then the member 34 will be fixed in adjusted position by the screw 35 to hold the diaphragms at the desired resonance.

Figure 8:
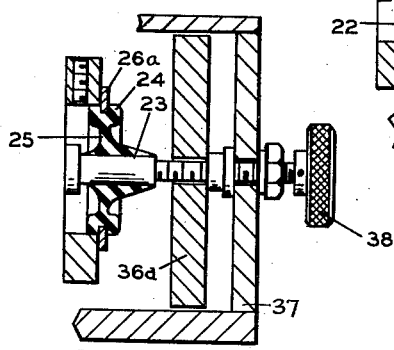
Figure 8 is a similar view showing a different arrangement for adjusting the resonance of the pick-up device.

In Figure 8, I have shown an arrangement whereby the resonance of the diaphragms may be varied more readily. In this case, there is provided an adjusting nut 38 outside of the plug 37 to vary the axial position of the disc 36a and thereby vary the flexibility of the diaphragms 22 so that they will resonate at a selected speed of balancing.

The leads 31 from the two pick-up devices will be connected by cables to a suitable vibration-analyzing instrument such as that disclosed in the copending application of Ongaro et al., Ser. No. 215,496, filed March 14, 1951.

It will be apparent that the balancing blocks of my invention are self-aligning, require no lubrication, and that the bearing elements can be removed and replaced readily. Overloading of the blocks will be precluded by the flexible supports for the blocks. The pick-up device is enclosed within each block and the flexibility of the diaphragms which suspend the pick-up device can be varied so that the device will resonate at a selected speed of balancing.

Having thus described my invention, what I claim is:

1. A balancing block having a chamber formed therein, means for suspending a voltage-generating vibrating pick-up device in said chamber, said means comprising flexible members, and means for changing the flexibility of said members.

2. A balancing block according to claim 1 in which said flexible members comprise diaphragms attached to said pick-up device and to the block, and means for stretching the diaphragms to vary their flexibility.

3. A balancing block according to claim 2 in which the pick-up device is contained within a tube that is disposed within a tubular chamber in the block, said diaphragms being attached at their peripheries to the tube and being disposed at their centers in fixed axial locations on supporting pins and means for moving the tube and pins relatively axially to stretch said diaphragms and vary the flexibility thereof.

4. A balancing block according to claim 3 including means for retaining said tube and pins in their relative adjusted position.

5. A balancing block according to claim 4 including a member attached to one of said pins and slidable axially of said chamber, and means for holding said member in a selected axial position of said chamber.

6. A balancing block comprising a body having a V-shaped bearing receiving cradle, each side of the cradle having a semi-cylindrical socket for receiving a bearing element, a semi-cylindrical bearing element mounted in each socket, each end of the bearing element and adjacent socket being provided with interfitting portions of semi-circular cross section which permit rocking of the element about its axis, said interfitting portions comprising an arcuate extension on the end of the element flush with its undersurface and a complemental arcuate slot in the end of the socket, and means for retaining each element in its socket but permitting rocking of the element in the socket about its axis.

7. A balancing block as set out in claim 6 wherein the socket at its outer end is provided with a cap which has the slot therein.

References Cited in the file of this patent

UNITED STATES PATENTS

| | | |
|---|---|---|
| 1,897,771 | Sherman | Feb. 14, 1933 |
| 2,286,825 | Montgomery | June 16, 1942 |
| 2,487,035 | Weaver et al. | Nov. 1, 1949 |